(12) United States Patent
Kerkman et al.

(10) Patent No.: US 7,342,380 B1
(45) Date of Patent: Mar. 11, 2008

(54) SYSTEM AND METHOD FOR ADJUSTABLE CARRIER WAVEFORM GENERATOR

(75) Inventors: Russel J. Kerkman, Milwaukee, WI (US); David Leggate, New Berlin, WI (US); Richard H. Radosevich, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/469,147

(22) Filed: Aug. 31, 2006

(51) Int. Cl.
*H02P 23/00* (2006.01)

(52) U.S. Cl. .................... 318/807; 318/801; 318/799; 318/800; 318/808; 318/809; 318/811

(58) Field of Classification Search ................ 318/807
See application file for complete search history.

(56) References Cited

U.S. PATENT DOCUMENTS 3,971,972 A * 7/1976 Stich ......................... 318/811
5,013,931 A * 5/1991 Estes, Jr. .................... 327/140
6,617,821 B2 * 9/2003 Kerkman et al. ........... 318/801
6,819,077 B1 * 11/2004 Seibel et al. ................ 318/801

* cited by examiner

*Primary Examiner*—Lincoln Donovan
*Assistant Examiner*—Michael Brandt
(74) *Attorney, Agent, or Firm*—Quarles & Brady LLP; Alexander R. Kuszewski

(57) ABSTRACT

A system and method for controlling an inverter of a motor control unit includes a controller having a user interface configured to allow user selection of a waveform increment value or a waveform amplitude threshold. The controller also includes an integrator configured to receive the waveform increment value and generate a signal at least based on the waveform increment value. A logic circuit is configured to monitor the signal and reset the integrator when the signal reaches the waveform amplitude threshold to generate a waveform having a frequency-independent amplitude. A comparator compares the waveform to a modulating signal to trigger gating pulses delivered to an inverter to drive an associated motor.

22 Claims, 4 Drawing Sheets

SYSTEM AND METHOD FOR ADJUSTABLE CARRIER WAVEFORM GENERATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor systems and, more particularly, to a system and method for controlling a waveform generator designed to control an inverter driving a motor. The waveform generator includes a user-selectable increment and amplitude threshold and generates a waveform that has a frequency-independent amplitude.

Motors and linked loads are one type of common inductive load employed at many facilities. To drive a motor, an inverter formed from a plurality of switches is controlled to link and unlink positive and negative DC buses to motor supply lines. The linking-unlinking sequence causes voltage pulses on the motor supply lines that define alternating voltage waveforms of controlled magnitude and frequency. When controlled correctly, the waveforms cooperate to generate a rotating magnetic field inside a motor stator core. In an induction motor, the magnetic field induces a field in the rotor windings of the motor. The rotor field is attracted to the rotating stator field and; thus, the rotor rotates within the stator core. In a permanent magnet motor, one or more magnets on the rotor are attracted to the rotating magnetic field.

Referring to FIG. 1, a motor system 10 generally includes a power supply 12, a motor drive unit 14, and a motor 16. The power supply 12 provides power to the motor drive unit 14 that, in turn, converts the power to a more usable form for the motor 16 that drives an associated load 18.

The motor drive unit 14 includes a variety of components, such as a rectifier 20, an inverter 22, and a controller 24. During operation, the power supply 12 provides single or multi-phase AC power, for example, as received from a utility grid over transmission power lines 26. The rectifier 20 is designed to receive the AC power from the power supply 12 and convert the AC power to DC power that is delivered to positive and negative DC buses 28, 30 of a DC link 31. However, in some cases, the power supply 12 may deliver DC power. In that case, the rectifier 20 would not be used, and the power supply 12 would connect directly to the DC link 31.

The inverter 22 is positioned between the positive and negative DC buses 28, 30 to receive the DC power delivered by the rectifier 20. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 32 to drive the motor 16 and, in turn, the load 18 through a drive shaft 34. Accordingly, the inverter 22 and additional control circuitry are collectively referred to as a motor drive unit 14. By controlling operation of these components, the motor drive unit 14 controls the overall operation of the motor.

As described, the controller 24 causes the switches of the inverter 22 to open and close in a specific sequence to generate pulses that, in turn, drive the motor 16. Traditional controllers 24 generally include pulse width modulation (PWM) generators with a defined carrier-frequency dependent amplitude. One common generator is a triangle comparison PWM generator. In such a generator, gate pulses are generated in response to a comparison of a modulating signal with the triangle carrier waveform. When the modulating signal exceeds the triangle carrier waveform, one switch in the inverter 22, for example an upper IGBT, is switched on by the controller 24 for that particular phase.

Accordingly, the characteristics of the triangle carrier waveform must be well known and carefully controlled to achieve optimal control of the inverter 22 and, in turn, the motor 16. However, generally, the amplitude of the triangle carrier waveform decreases as the frequency is increased. This inverse relationship limits flexibility and affects output waveform distortion.

Referring to FIG. 2, one common triangle carrier waveform generator 36 is an up/down counter. In accordance with this traditional design, the desired triangle carrier waveform is produced as an output 38 of a summer 39 that, in general, is a sum of a preset increment 40 and a feedback 41 of the output 38 after being subjected to a delay 41 of one clock cycle.

The sign on the value added to the output 38 is selected by a D-latch 46 controlling a switch 47 that is driven by a set of combinational logic 48, in particular, opposing comparators 49, 50 together with an exclusive OR gate 52. One or more additional delays 54 are typically added to the system to prevent instabilities in the combinatorial logic 47.

Referring to FIGS. 1 and 2, since the output voltage of the inverter 22 is controlled based on the clock frequency of the controller 24, all PWM generators face the same fundamental limiting relationship given by:

$$\frac{A}{N} = \frac{f_{clk}}{2 * f_{cl}}; \qquad \text{Eq. 1}$$

where N is the carrier incremental voltage or count, A is the peak of the triangle carrier waveform, $f_{clk}$ is the clock frequency, and $f_{cl}$ is the frequency of the carrier signal. Hence, in a traditional up/down counter waveform generator 36, the triangle carrier waveform is determined by setting the peak of the triangle carrier waveform (A) with an increment (N) of unity. Within this configuration, the peak of the triangle carrier waveform is established by the frequency of the clock ($f_{clk}$) of the motor control chip and the lowest carrier frequency ($fc_{min}$). This maximum count ($A_{max}$) is then given by:

$$A_{max} = \frac{f_{clk}}{2 * fc_{min}}. \qquad \text{Eqn. 2}$$

For a given $A_{max}$, $fc_{min}$, and reduction in the increment (N), the carrier offset is given by:

$$\Delta fc = \frac{N}{(A_{max} - N)} * fc_{min}. \qquad \text{Eqn. 3}$$

Accordingly, the frequency of the triangle carrier waveform is given by:

$$fc = fc_{min} + \Delta fc \qquad \text{Eqn. 4.}$$

For example, referring again to FIG. 2, the frequency of the triangle carrier waveform is set by adjusting a value of an upper limit variable 44. For example, if the lowest desirable frequency of the triangle carrier waveform carrier is 2 kHz and this corresponds to a count value of $2^{16}$, then a waveform having a frequency of 4 kHz will have a peak of $2^{15}$.

These constraints significantly limit the feasible resolution of the triangle carrier waveform and affects ability to control the system. First, a fixed carrier spacing restricts carrier selection for synchronous PWM, which limits the benefits of synchronized carrier operation. Second, disturbance-free transition to over-modulation may be prevented because of a conflict between dead-time compensation and allowable triangle carrier waveform frequencies. Third, the fixed carrier resolution requires the system to round to the same resolution as the prescribed carrier increment. Therefore, even if a processor or controller having increased word size and processing power is selected, the ability to exploit this increased bandwidth is limited.

For example, by doubling the frequency, the quantization interval for the available voltage is doubled. This increased quantization interval is imparted to the carrier waveform and is not adjustable. As a result, the controller 24 has difficulty matching comparison boundaries between the modulating signal waveform and the triangle carrier waveform. This causes a loss in accuracy due to rounding errors and can lead to increased harmonic distortion in the output voltage of the inverter 22. As such, any potential advantage sought by increasing carrier frequency can be offset.

Additionally, traditional PWM generators typically drive each of the PWM channels based on one common triangle carrier waveform. As such, the accuracy with which the output voltage of the inverter 22 can be controlled is significantly limited. In fact, such traditional PWM generators are particularly limited at low speeds, where the line-to-line voltages are comparable to dead time. Dead time is typically defined as the state of non-conduction of upper and lower power device. In this case, a typical voltage would be:

$$\frac{2 \text{ }\mu sec \times V_{bus}}{256 \text{ }\mu sec} = 5 \text{ volts}, \frac{t_d \times V_{bus}}{f_c}; \qquad \text{Eqn. 5}$$

where $V_{bus}$ is the voltage along the DC bus and $t_d$ is the dead time in microseconds.

Therefore, it would be desirable to have a system and method for providing increased flexibility in the converter/inverter output voltage generation. Furthermore, it would be desirable to have a system and method for yielding improved voltage generation and greater flexibility in waveform generation to reduce common mode voltage, allow pole independent carrier selection, and control dead-time compensation.

BRIEF SUMMARY OF THE INVENTION

The present invention overcomes the aforementioned drawbacks by providing a waveform generator capable of generating a waveform having a frequency-independent amplitude to trigger control of an inverter driving a motor. Additionally, the waveform generator includes a user-selectable increment and amplitude threshold to generate a highly customizable waveform.

In accordance with one aspect of the present invention, a controller is disclosed for controlling an inverter of a motor control unit. The controller includes a user interface configured to allow user selection of a waveform increment value or a waveform amplitude threshold. The controller also includes an integrator configured to receive the waveform increment value and generate a signal at least based on the waveform increment value. A logic circuit is configured to monitor the signal and reset the integrator when the signal reaches the waveform amplitude threshold to generate a waveform having a frequency-independent amplitude. A comparator compares the waveform to a modulating signal to trigger gating pulses delivered to an inverter to drive an associated motor.

In accordance with another aspect of the present invention, a method of generating a waveform for controlling an inverter driving a motor is disclosed. The method includes generating a first signal based on a first of a positive increment value and a negative increment value and calculating an amplitude threshold value based on the positive increment value or the negative increment value. The method also includes comparing the signal to the amplitude threshold value and, upon determining the first signal has reached the amplitude threshold value, generating a second signal based on a second of the positive increment value and a negative increment value. Additionally, the method includes delivering the first signal followed by the second signal to a controller as a carrier waveform to trigger gating pulses delivered to an inverter to drive a motor.

In accordance with yet another aspect of the invention, a waveform generator is disclosed for driving a pulse-width modulation process designed to control an inverter to generate voltage pulses to power a motor. The waveform generator includes a user interface configured to allow user selection of at least one operational parameter including an increment value. The waveform generator also includes an integrator configured to generate a signal at least based on the increment value and a logic circuit configured to monitor the signal and control the integrator to adjust the signal to generate a waveform having a frequency-independent amplitude.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
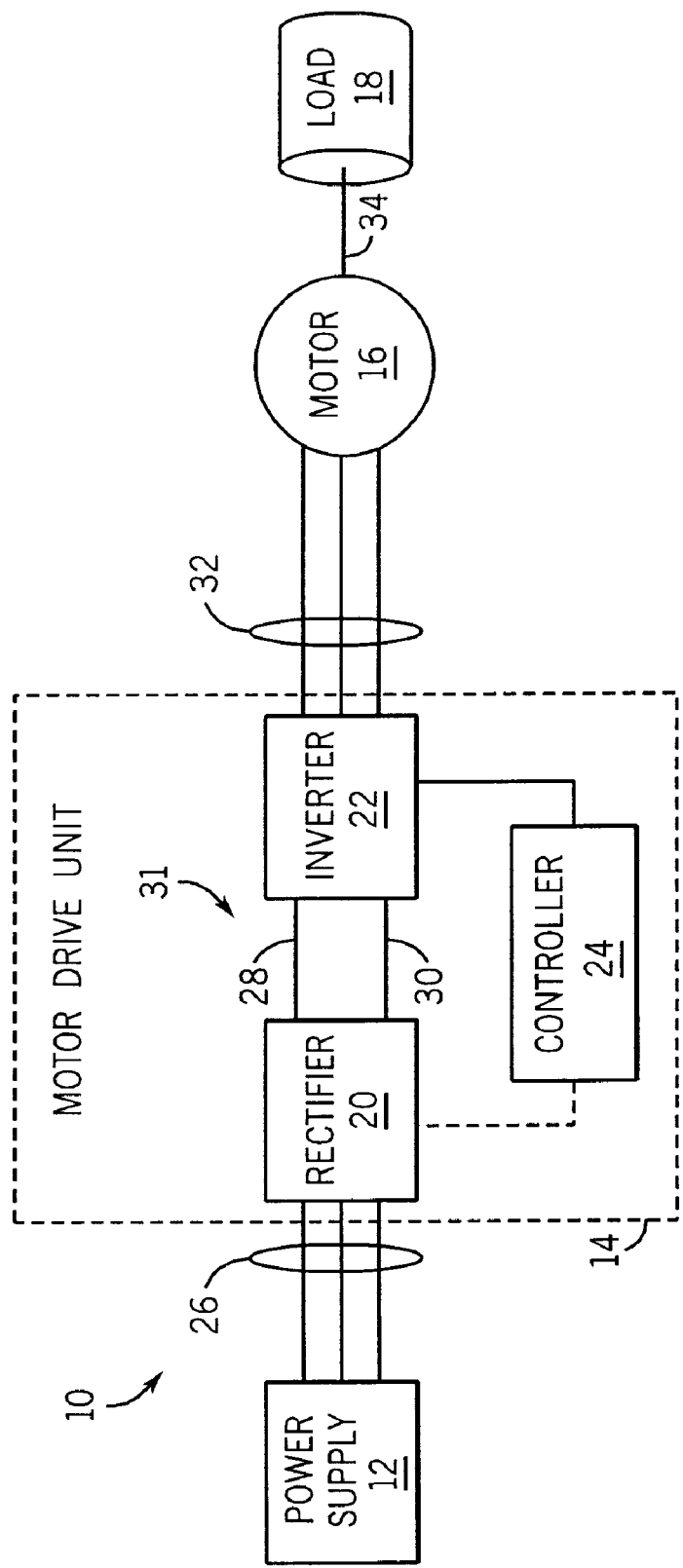
FIG. 1 is a schematic illustration of a motor system having a motor drive unit configured to control operation of a motor in accordance with the present invention.
Figure 2:
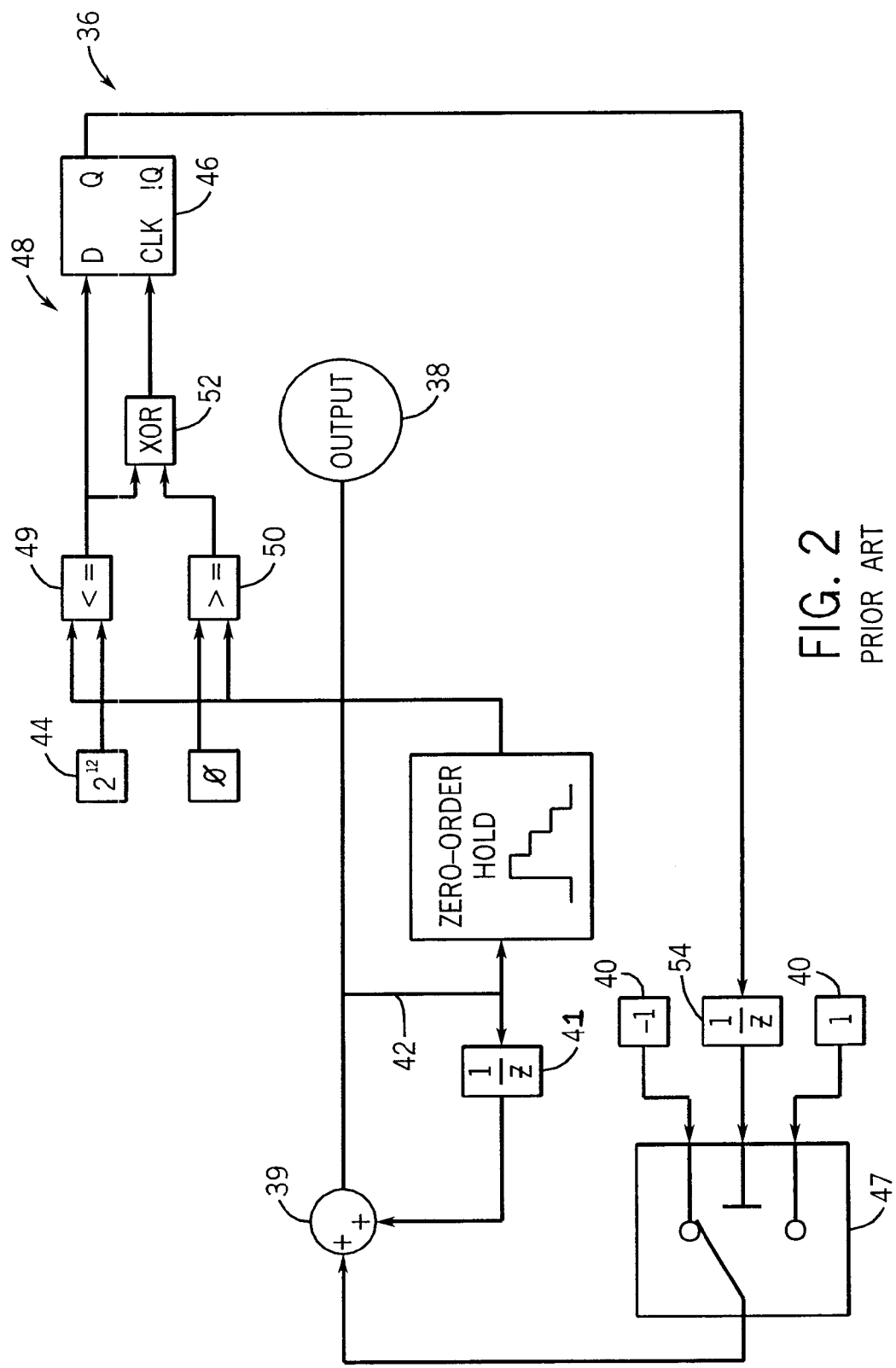
FIG. 2 is a schematic illustration of a traditional up/down counter-based triangle carrier waveform generator for driving a controller of the motor control unit of FIG. 1.
Figure 3:
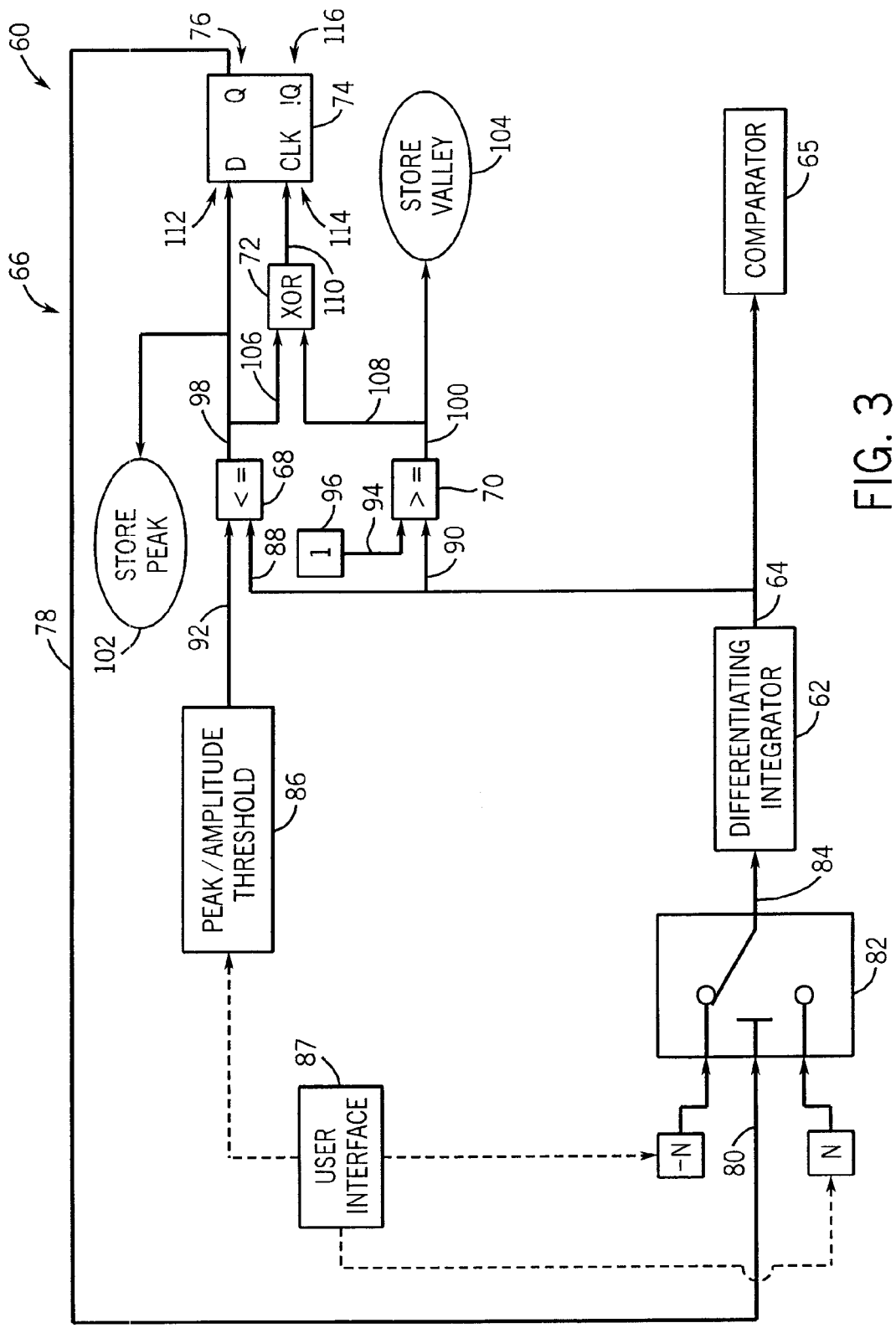
FIG. 3 is a schematic illustration of an adjustable amplitude/increment triangle generator for driving a controller of the motor control unit of FIG. 1.

Referring now to FIG. 3, the present invention provides an adjustable amplitude/increment triangle generator 60 that includes an integrator 62 having an output 64 connected to a comparator 65 that, as described above, compares the waveform generated by the integrator 62 to a modulating signal. When the modulating signal exceeds the triangle carrier waveform generated by the integrator 62, a controller, such as the controller 24 of FIG. 1, switches one switch in the inverter to drive the associated motor. In this regard, the triangle carrier waveform delivered by the generator 60 is used by the controller 24 of FIG. 1 to control the inverter 22.

To control the integrator 62, the output 64 is delivered to a set of combinational logic circuits 66 that includes a less-than-or-equal-to rational operator 68, a greater-than-or-equal-to rational operator 70, and an exclusive OR logical operator 72 that serve as inputs to a D-latch 74. As will be described, a "Q" output 76 of the D-latch 74 is provided through a feedback loop 78 to function as a control input 80 of a switch 82 designed to control operation of the integrator 62.

In particular, the switch 82 is controlled via the input 80 to select one of a positive increment (N) and a negative increment (−N). Thus, the switch 82 provides one of N and −N to an input 84 of the integrator 62. The integrator 62 is a differentiating integrator and; therefore, based on whether the input 84 is connected to N or −N, generates a steadily increasing or decreasing waveform that is delivered to the output 64.

The peak (whether positive or negative) of the waveform delivered by the integrator 62 is defined by an amplitude or peak threshold 86 that may be defined based on the increment value (N), which is preferably user selectable. In particular, the peak threshold or amplitude (A) 86 is equal to one half of the increment value (N) divided by the product of a sampling period ($T_{samp}$) and a pulse width modulation period ($T_{PWM}$). Hence, the amplitude (A) of the triangle carrier waveform generated by the integrator 62 is given by:

$$A = \frac{\frac{1}{2}N}{T_{SAMP} * T_{PWM}}.$$  Eqn. 6

As will be described, a user interface 87 is included that allows user selection or adjustment of the increment values (N and −N) and/or the peak threshold 86. That is, since, as illustrated above in Equation 4, the peak threshold 86 is a function of the increment (N), the user interface 87 is designed to allow a user to select an increment value (N). In this case, the combinational logic circuit calculates the peak threshold 86 based on the user selected increment value (N). Alternatively, the user interface 87 may allow a user to select a peak threshold 86, which is expressed as the desired amplitude of the triangle carrier waveform. Accordingly, the corresponding increment value (N) is calculated based on the selected peak threshold 86.

To control the amplitude of the waveform delivered by the integrator 62, the output 64 of the integrator 62 is delivered as secondary inputs 88, 90 to the less-than-or-equal-to rational operator 68 and the greater-than-or-equal-to rational operator 70, respectively. The primary inputs 92, 94 of the less-than-or-equal-to rational operator 68 and the greater-than-or-equal-to rational operator 70 are the peak threshold 86 and a static lower limit 96, respectively. Accordingly, an output 98 of the less-than-or-equal-to rational operator 68 is a true or "high" value until the triangle carrier waveform generated by the integrator 62 and provided to the secondary input 88 reaches the peak threshold 86, when it switches to a false or "low" value. Likewise, an output 100 of the greater-than-or-equal-to rational operator 70 is true or "high" value until the triangle carrier waveform generated by the integrator 62 and provided to the secondary input 90 reaches the static lower limit 96, when it switches to a false or "low" value. These transitions to the false or "low" value can be delivered to outputs 102, 104 that are designed to record the peak and valley values of the triangle carrier waveform, respectively, for additional processing or system analysis.

By design, as long as the current value of the triangle carrier waveform is between the peak 86 and the lower limit 96, the outputs 98, 100 of the less-than-or-equal-to rational operator 68 and the greater-than-or-equal-to rational operator 70 are the same, in this case, both high. However, it is noted that the configurations of the combinational logic 66 could be inverted such that the outputs 98, 100 of the less-than-or-equal-to rational operator 68 and the greater-than-or-equal-to rational operator 70 would both remain low as long as the current value of the triangle carrier waveform is between the peak 86 and the lower limit 96 without changing the overall functionality of the adjustable amplitude/increment triangle generator 60. In either case, the inputs 106, 108 of the exclusive OR logical operator 72 both receive a high (or low) signal from the outputs 98, 100 of the less-than-or-equal-to rational operator 68 and the greater-than-or-equal-to rational operator 70. As such, an output 110 of the exclusive OR logical operator 72 is held as false or "low" until one of the outputs 98, 100 of the less-than-or-equal-to rational operator 68 and the greater-than-or-equal-to rational operator 70 is caused to change because, as described above, the triangle carrier waveform has reached a peak or valley.

The output 98 of the less-than-or-equal-to rational operator 68 is delivered to a "D" input 112 of the D-latch 74 and the output 110 of the exclusive OR logical operator 72 is delivered to a clock (clk) input 114 of the D-latch 74. Accordingly, by definition, the current value delivered to the "D" input 112 of the D-latch 74 will be delivered to the "Q" output 76 of the D-latch 74 as long as the value delivered to the clock input 114 remains high.

The value delivered by the Q output 76 of the D-latch 74 is then used to control the switch 82. In particular, a change at the Q output 76 of the D-latch 74 is delivered to the control input 80 of the switch 82 that, responsive thereto, connects the input 84 of the integrator 62 to either N (the positive increment) or −N (the negative increment) to thereby reset the direction of the carrier waveform delivered at the output 64 of the integrator 62. It should be noted that, as described above, the Q output 76 of the D-latch 74 is delivered a feedback loop to the control input 80 of the switch 82; however, it is also contemplated that the "NOT Q" output 116, though shown as unused, could be used to control the switch 82.

Therefore, a triangle carrier waveform is created that has characteristics, that are adjustable. However, while various characteristics of the triangle carrier waveform are adjustable, the waveform has a frequency-independent amplitude. In particular, the characteristics of the triangle carrier waveform delivered at the output 64 of the integrator 62 can be augmented by adjusting the increment (N/−N) that, in turn, adjusts the amplitude or peak value 86 because, as described above, the amplitude or peak value is calculated, in part, based on the increment value (N). As will be described below, the adjustable amplitude/increment triangle generator 60 allows a user to adjust the amplitude and associated characteristics of the triangle carrier waveform without incurring the wide variety of drawbacks associated with such changes using traditional triangle waveform generators.

In particular, in traditional motor control chips employing an up/down counter to generate a triangle waveform, an increase in the effective frequency resolution can be achieved by changing the amplitude (A) half way through the period of the carrier waveform ($T_{PWM}/2$). For example, if the amplitude is decreased one count at the peak and reset to 5000 at the valley, the effective PWM period ($T_{PWM}$) becomes 4.0004 kHz, an effective resolution of 0.4 Hz. When changing the triangle peak by one count, from 5000 to 4999, the frequency of the triangle carrier waveform is changed to 4.0008 kHz.

However, as explained above, such user-selected control is achieved at the expense of the carrier waveform having an isosceles form. In particular, while an effective resolution of approximately 0.8 Hz is achieved, this presents a problem at a 50% duty cycle because the 50% duty cycle now falls between quantisized levels. In fact, any amplitude that is odd will present a similar problem. As a result, a 50% duty cycle or zero voltage is not attainable when using the traditional motor control chips employing an up/down counter to generate a triangle waveform. This can lead to objectionable dither in the output current when diagnosing current sensor functionality.

On the other hand, using the above-described adjustable amplitude/increment triangle generator 60, the amplitude of the triangle carrier waveform can match the effective resolution of the traditional up/down carrier waveform without being plagued by the "50% duty cycle problem" by doubling the amplitude and the increment at the peak. In general, when the peak threshold 86 is odd, the peak and increment are doubled to ensure proper delivery of a 50% duty cycle. Furthermore, by increasing the increment toward the peak threshold 86, single edge modulation is possible.

For example, if the peak threshold 86 of the triangle carrier waveform is set to 5000, with an increment of unity and a clock frequency of 40 MHz, $f_c$ is 4 kHz. By simply decreasing the peak of the triangle waveform to 4999 and maintaining an increment of unity, $f_c$ is equal to 5000/4999 multiplied by 4, or 4.0008 kHz. Comparing signal spectrums of a traditional up/down counter-based generator to the above-described adjustable amplitude/increment triangle generator 60 shows that at a clock frequency of 40 MHz, $f_c$ of 4 kHz, increment of unity, and a value of amplitude-to-increment ratio of 5000, identical waveforms are generated. Therefore, the amplitude of the triangle carrier waveform is not frequency dependent. By allowing the amplitude and/or increment to be adjusted independent of frequency, increased flexibility is achieved.

While, in general, the creation of a waveform generator that is capable of creating a triangle waveform having an adjustable amplitude/increment would lend itself to a variety of designs, the constraints placed on such a generator when used in a motor control unit present significant technical design impediments. For example, while a variety of different implementations of the integrator 62 are possible, the advantages and disadvantages of each implementation must be weighted.

Figure 4:
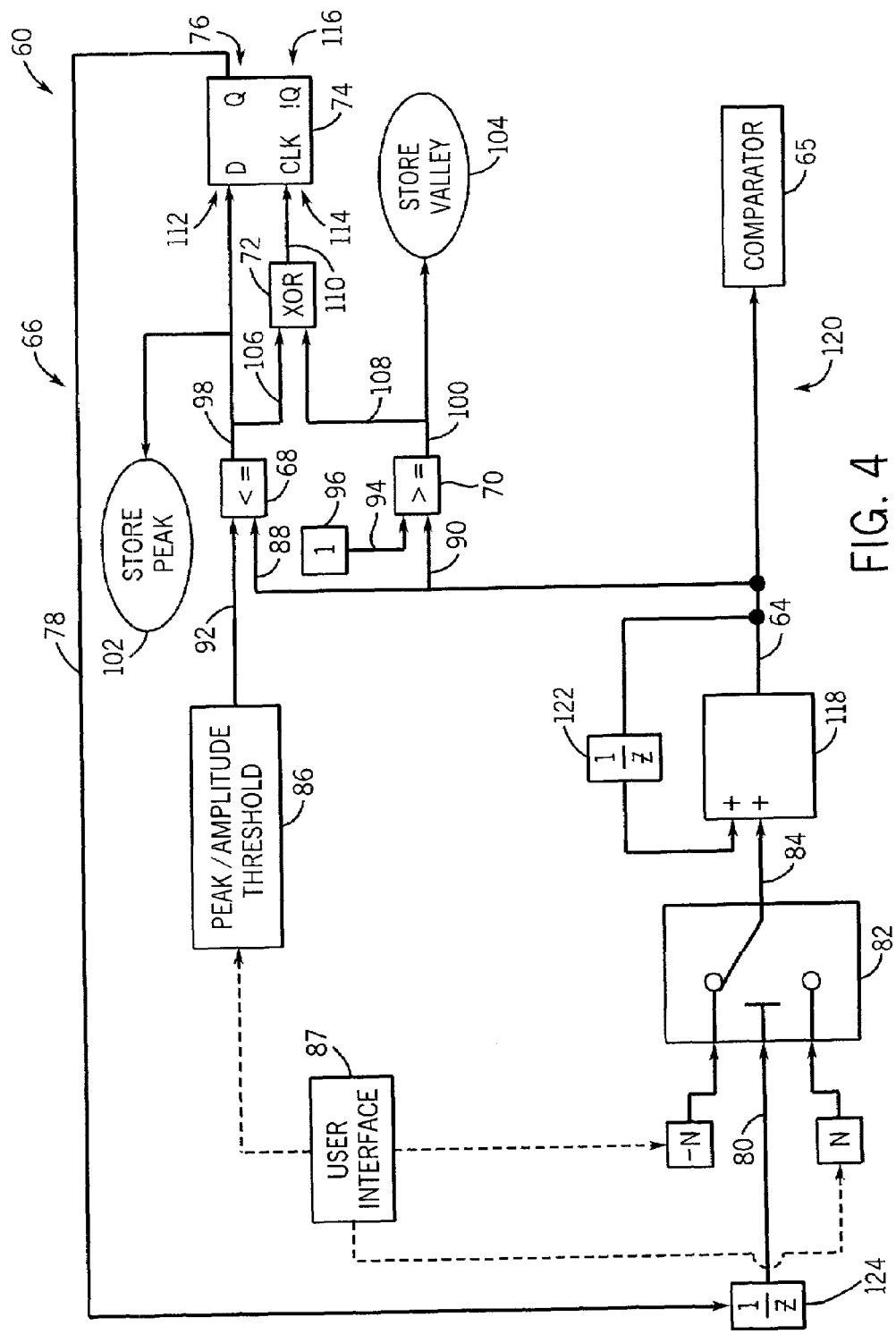
FIG. 4 is a schematic illustration of another adjustable amplitude/increment triangle generator for driving a controller of the motor control unit of FIG. 1.

Beyond the above-described configuration, it is contemplated that a Backward Euler integrator 118 design may be utilized. However, as shown in FIG. 4, this configuration 120 includes an algebraic loop 122 and can produce timing conflicts when implemented. Accordingly, to address the potential for timing conflicts, it is contemplated that an additional delay 124 may be added to the feedback loop 78. This delay 124, in effect, creates a Euler Forward integrator configuration.

In the implementations described above with respect to FIGS. 3 and 4, the peak threshold and increment are user selectable. The adjustable amplitude/increment triangle generator 60 may be interfaced with or accessed by a variety of systems and/or may be integrated into complex Field-programmable gate array (FPGA) designs. In accordance with one embodiment, it is contemplated that the user interface 87 may be presented that allows user selection of the triangle amplitude and/or increment. In this regard, this user interface may be provided to a user through a variety of mediums, such as a user interface integrated into the motor drive unit, a traditional or handheld computer that can be interfaced with the motor drive unit to access the adjustable amplitude/increment triangle generator 60, or a remote or network accessible (intranet or internet) user interface.

Additionally, the user interfaces may be designed to provide additional information for diagnostics and tracking. For example, as described above, it is contemplated that the adjustable amplitude/increment triangle generator 60 may store operational information, such as the peak 102 and valley 104 values. Accordingly, the user interface may provide this and additional information for tracking, analysis, and the like.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A controller for controlling an inverter of a motor control unit, the controller comprising:
    a user interface configured to allow user selection of at least one of a waveform increment value and a waveform amplitude threshold;
    an integrator configured to receive the waveform increment value and generate a signal at least based on the waveform increment value;
    a logic circuit configured to monitor the signal and reset the integrator when the signal reaches the waveform amplitude threshold to generate a waveform having a frequency-independent amplitude; and
    a comparator configured to compare the waveform to a modulating signal to trigger gating pulses delivered to an inverter to drive an associated motor.

2. The controller of claim 1 wherein the logic circuit is further configured to calculate the waveform amplitude threshold based on the waveform increment value.

3. The controller of claim 1 wherein the logic circuit is further configured to calculate the waveform increment value based on the waveform amplitude threshold.

4. The controller of claim 1 wherein the user interface is further configured to allow user adjustment of the frequency-independent amplitude.

5. The controller of claim 1 wherein the user interface is accessible through at least one of a display integrated into the motor control unit, a computer interfaced with the motor control unit, and a network accessible address.

6. The controller of claim 1 wherein the integrator includes at least one of a backwards Euler integrating circuit, a forward Euler integrating circuit, and a differentiating integrating circuit.

7. The controller of claim 1 wherein the user interface is further configured to allow user adjustment of the frequency-independent amplitude to match periodic trigger points between the waveform and the modulating signal to trigger the gating pulses delivered to the inverter at a common periodic interval.

8. The controller of claim 1 wherein the waveform is a triangle wave.

9. A method of generating a waveform for controlling an inverter driving a motor, the method comprising the steps of:
 (A) generating a first signal based on a first of a positive increment value and a negative increment value;
 (B) calculating an amplitude threshold value based on one of the positive increment value and the negative increment value;
 (C) comparing the signal to the amplitude threshold value;
 (D) upon determining the first signal has reached the amplitude threshold value, generating a second signal based on a second of the positive increment value and a negative increment value; and
 (E) delivering the first signal followed by the second signal to a controller as a carrier waveform to trigger gating pulses delivered to an inverter driving a motor.

10. The method of claim 9 further comprising the step of (F) adjusting a frequency of the carrier waveform without affecting the amplitude of the carrier waveform.

11. The method of claim 10 further comprising the step of (F) adjusting at least one of the positive increment value, the negative increment value, and the amplitude threshold value.

12. The method of claim 9 further comprising the step of (F) adjusting the amplitude threshold value to match periodic trigger points between the carrier waveform and a modulating signal to trigger the gating pulses delivered to the inverter at a common periodic interval.

13. A waveform generator for driving a pulse-width modulation process designed to control an inverter to generate voltage pulses to power a motor, the waveform generator comprising:
 a user interface configured to allow user selection of at least one of an increment value and an amplitude threshold;
 a logic circuit comprising a switch, a D-latch, and an integrator;
 wherein the integrator is configured to generate a signal at least based on the increment value; and
 wherein the logic circuit is configured to monitor the signal and control the integrator to adjust the signal to generate a waveform having a frequency-independent amplitude.

14. The waveform generator of claim 13 wherein the logic circuit is further configured to calculate the amplitude threshold value based on the increment value and reset the integrator upon determining that the signal has reached the amplitude threshold value.

15. The waveform generator of claim 14 wherein the amplitude threshold value is user selectable.

16. The waveform generator of claim 13 wherein the user interface is further configured to allow user adjustment of the frequency-independent amplitude.

17. The waveform generator of claim 13 wherein the waveform is a triangle carrier waveform configured to be compared to a modulating signal and wherein, when the modulating signal exceeds the triangle carrier waveform, a gating pulse is generated.

18. The waveform generator of claim 17 wherein the user interface is further configured to allow user adjustment of the frequency-independent amplitude to match periodic comparison points between the triangle carrier waveform and the modulating waveform.

19. The waveform generator of claim 17 wherein the gating pulse is delivered to the inverter to generate a voltage pulse to power the motor.

20. The waveform generator of claim 13 wherein the integrator includes at least one of a backwards Euler integrating circuit, a forward Euler integrating circuit, and a differentiating integrating circuit.

21. A trigger system comprising:
 a user interface configured to allow user selection of at least one of a waveform increment value and a waveform amplitude threshold;
 an integrator configured to receive the waveform increment value and generate a signal at least based on the waveform increment value;
 a logic circuit configured to monitor the signal and reset the integrator when the signal reaches the waveform amplitude threshold to generate a waveform having a frequency-independent amplitude; and
 a comparator configured to compare the waveform to a modulating signal to trigger gating pulses.

22. The system of claim 21 wherein the gating pulses are used to pulse width modulate one of a coils, a magnet, an induction heater, a welder, and a motor.

* * * * *